Dec. 29, 1931.  E. E. KELLEY  1,838,263
FILTER FOR PURIFYING CLEANING SOLVENTS, GASOLINE, ETC
Filed Feb. 21, 1931
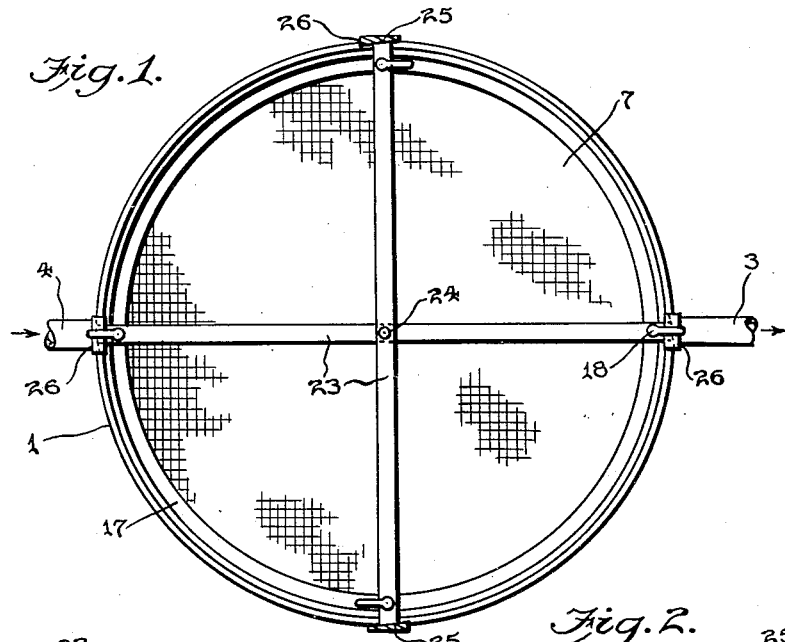
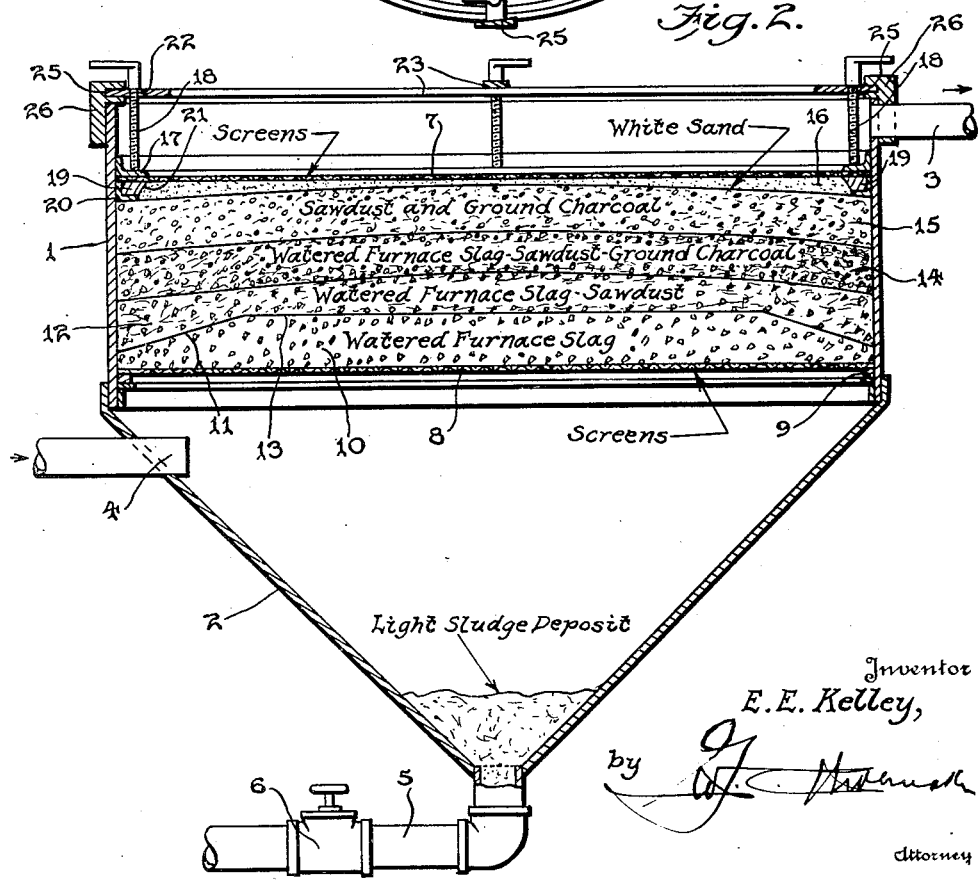

Patented Dec. 29, 1931

1,838,263

UNITED STATES PATENT OFFICE

EUGENE E. KELLEY, OF GREENSBURG, PENNSYLVANIA, ASSIGNOR TO KELLEY ENGINEERING COMPANY, OF GREENSBURG, PENNSYLVANIA

FILTER FOR PURIFYING CLEANING SOLVENTS, GASOLINE, ETC.

Application filed February 21, 1931. Serial No. 517,591.

The invention relates to a filter for purifying cleaning solvents, gasoline, etc.

The object of the present invention is to provide a simple, practical, and comparatively inexpensive filter for purifying cleaning solvents, gasoline and the like by removing therefrom soap, oil, water and other suspended foreign matter, without the use of acids and alkalis, thereby avoiding burning and loss of gas and at the same time producing by such filtering a refined cleaning solvent having a better cleaning action than the filtering solvent before it was used, and one which will not become rancid or pick up a rancid odor, but will remain sweet for an indefinite period of time.

With these and other objects in view, the invention consists in the novel combination and arrangement of parts hereinafter described, illustrated in the accompanying drawings, and set forth in the claims hereto appended, it being understood that various changes in the form, proportions, and minor details of construction, within the scope of the claims, may be resorted to without departing from the spirit of the invention or sacrificing any of the advantages thereof.

In the drawings:

Figure 1 is a plan view of a filter embodying the invention.

Fig. 2 is a vertical sectional view of the same.

In the accompanying drawings, in which is illustrated the preferred embodiment of the invention, the filter comprises in its construction a filter bed, and a filter casing composed of an upper cylindrical section 1 and a lower inverted conical section 2 constructed of suitable metal. The upper cylindrical section, which is provided at the top with an outlet 3, contains the filter bed, and the lower conical section 2 constitutes a sludge cone and is adapted to receive the liquid to be filtered through an inlet 4 located at the upper portion of the lower conical section. The liquid to be filtered may be received from an ordinary settling tank where the heavy sludge is removed, but this course is unnecessary, although if the heavy sludge is removed and the liquid contains only the light sludge the filter bed will last a much longer time, as will be readily understood. The sludge cone is provided at the bottom at its apex with a sludge drain 5 having a suitable valve 6 of the ordinary construction for controlling the discharge of the sludge from the bottom of the sludge cone. The sludge settles at the bottom of the sludge cone and the liquid from which the sludge is removed passes upward through the filter bed, is cleaned, and leaves the filter through the outlet 3. Any suitable means may, of course, be employed for producing a sufficient head or pressure of the liquid to cause the same to pass through the filter bed.

The filter bed, which is provided with top and bottom metallic screens 7 and 8, is supported upon the lower interiorly arranged ledge 9 formed by a flange or collar suitably secured to the inner face of the cylindrical section of the filter casing adjacent the lower edge thereof. The filter bed is composed of a plurality of layers of granular material which increases in fineness from the bottom to the top of the bed. The bottom layer 10, which is arranged upon the bottom screen 8, consists of granulated watered furnace slag, which is well known and which forms a spongy mass. The bottom layer has an outwardly tapered peripheral portion 11 which presents an annular downwardly and outwardly inclined surface to the next adjacent superimposed layer 12 which is composed of a mixture of watered furnace slag and sawdust, preferably in the proportion of one half furnace slag and one half sawdust. The proportion is by bulk, and the watered furnace slag and sawdust are thoroughly commingled. The central portion 13 of the upper face of the bottom layer 10 is horizontal, and the central portion of the lower face of the layer 12 is also horizontal. The annular marginal or peripheral portion of the said layer 12 is inclined, extending downwardly and outwardly, the inclination being produced by the tapered marginal portion of the bottom layer and operating to cause the material of the layer 12 to pack tightly against the inner face of the wall of the upper cylindrical section of the filter casing.

The next higher intermediate layer 14 of the filter bed is composed of a mixture of watered furnace slag, sawdust, and ground charcoal, preferably in the proportion of 45% furnace slag, 45% sawdust, and 10% ground charcoal. The proportions may, of course, be varied, and the layer 14, which is substantially the central intermediate layer of the bed, is finer, because of the ground charcoal, than the slag and sawdust mixture of the layer 12. The marginal portion of the approximately central intermediate layer 14 inclines downwardly and outwardly to cause a packing of the material against the wall of the filter casing, and a top intermediate layer 15 is arranged upon the central intermediate layer 14. The upper intermediate layer 15, which is finer than the layer 14, is composed of sawdust and ground charcoal in the proportion of 80% sawdust and 20% charcoal, and the form of the layer is approximately the same as the form of the layers 12 and 14, the annular marginal portion being inclined downwardly and outwardly to cause a packing of the material against the wall of the cylindrical portion of the filter casing. The filter bed is covered with a top layer 16 of white sand. This top layer has a horizontal top surface and is a leveling layer, being tapered inwardly from its periphery to compensate for the inclined marginal portion of the upper intermediate layer 15.

The inclined marginal portions of the intermediate layers, which tend to produce a packing of the material against the walls of the receptacle, prevent liquid from flowing upward between the filter bed and the walls of the receptacle and in order to effectually eliminate any possibility of such action of any of the liquid and to insure a passage of all of the liquid through the filter bed, the filter is provided with a pressure ring 17 of angle iron or other suitable material located above the marginal portion of the top screen and engaged by adjusting screws 18 which are adapted to produce the required pressure on the material of the filter bed at the marginal portion of the same adjacent the wall of the cylindrical section of the filter casing. An annular packing 19, preferably of wood, is arranged below the pressure ring and is provided with a lining 20 of felt or other suitable material secured to the wooden packing ring 19 at the bottom and outer side face of the same. The inner side face 21 of the packing ring is beveled to present an inclined face extending upwardly and inwardly from the lower face of the packing ring and adapted to enable the packing ring to engage the granular material of the filter bed without liability of breaking the same and producing spaces or voids therein. The adjusting screws will enable the desired pressure to be applied to the pressure ring and the packing ring, which by its felt covering has a liquid-tight contact for engagement with the wall of the filter casing, so that no liquid can possibly pass upwardly between the packing and the wall of the filter casing.

The adjusting screws, which are preferably four in number, are mounted in threaded openings 22 of crossed bars 23 connected at the center by a suitable pivot 24 and having their terminals detachably interlocked with slots or recesses 25 of plates 26 secured to the exterior of the cylindrical portion of the filter casing at the top thereof and projecting above the upper edge of the same. The slots 25 are arranged at the inner sides of the plates 26, and when the pressure ring is relieved of pressure by the withdrawal of the adjusting screws 18, the bars may be readily disengaged from the slots of the plates or engaged therewith.

The filter, which is designed particularly for purifying cleaning solvents such as the Stoddard cleaning solvent, will remove soap, oil, water and other foreign matter held in suspension by the liquid to be cleaned, and it has been found that a cleaning solvent which has been used is more refined after passing through the filter bed and has a better cleaning action than it had before it was first used. The filter obviates the necessity of employing acids and alkalis for refining cleaning solvents, and the cleaning solvent does not become rancid or pick up a rancid odor, and will remain sweet for an indefinite period of time.

What I claim is:

1. A filter of the class described having a filter bed consisting of a plurality of superimposed layers of filtering material, the bottom layer being tapered outwardly at its periphery to present a downwardly and outwardly inclined upper surface, and succeeding layers having inclined annular peripheral portions of substantial thickness adapted to cause the material to pack against the walls of a filter casing.

2. A filter of the class described having a filter bed consisting of a plurality of superimposed layers of filtering material, the bottom layer being tapered outwardly at its periphery to present a downwardly and outwardly inclined upper surface, succeeding layers having inclined annular peripheral portions of substantial thickness adapted to cause the material to pack against the walls of a filter casing, and a top leveling layer of filtering material having an inwardly tapered marginal portion compensating for the inclination of the marginal inclined portion of the adjacent layer.

3. A filter of the class described comprising a filter casing, a filter bed of granular filtering material, a packing member arranged at the top of the filter bed contiguous to the walls of the filter casing and provided with a yieldable covering at its outer side face contiguous to the walls of the filter casing, the inner side face being inclined downwardly and outwardly from the upper face of the packing member, and means for applying pressure to the packing member to increase the density of the granular material at the walls of the filter casing.

4. A filter of the class described comprising a filter casing, a filter bed of granular filtering material, a packing member arranged at the top of the filter bed contiguous to the walls of the filter casing and provided with a yieldable covering at its outer side face contiguous to the walls of the filter casing, the inner side face being inclined downwardly and outwardly from the upper face of the packing member, a pressure ring located above the packing member, and adjusting screws for applying pressure to the pressure ring and the packing member.

5. A filter of the class described provided with a filter bed consisting of a plurality of superimposed layers including a layer of watered furnace slag, a layer of slag and sawdust, a layer of slag, sawdust and ground charcoal, and a layer of sawdust and charcoal.

6. A filter of the class described provided with a filter bed consisting of a plurality of superimposed layers including a bottom layer of watered furnace slag, a lower intermediate layer of slag and sawdust, a central intermediate layer of slag, sawdust and ground charcoal, an upper intermediate layer of sawdust and charcoal, and a top layer of sand.

In testimony whereof, I affix my signature this 20th day of February, 1931.

EUGENE E. KELLEY.